(12) United States Patent
Kanai et al.

(10) Patent No.: US 7,583,308 B2
(45) Date of Patent: Sep. 1, 2009

(54) IMAGE CAPTURING APPARATUS

(75) Inventors: Kunihiko Kanai, Nagano (JP);
Hidenori Shiraki, Nagano (JP)

(73) Assignee: Eastman Kodak Company, Rochester, NY (US)

( * ) Notice: Subject to any disclaimer, the term of this patent is extended or adjusted under 35 U.S.C. 154(b) by 567 days.

(21) Appl. No.: 11/360,899

(22) Filed: Feb. 23, 2006

(65) Prior Publication Data
US 2007/0024738 A1 Feb. 1, 2007

(30) Foreign Application Priority Data
Jul. 29, 2005 (JP) ............... 2005-222088

(51) Int. Cl.
*H04N 5/225* (2006.01)
(52) U.S. Cl. .................. 348/335; 348/240.3
(58) Field of Classification Search .................
348/333.01–333.13, 335, 47, 48, 231.3,
348/231.99, 239, 207, 369, 240.1, 240.3;
359/676, 697–698, 85–87, 72; 396/60
See application file for complete search history.

(56) References Cited

U.S. PATENT DOCUMENTS

| 5,194,959 | A | * | 3/1993 | Kaneko et al. | 348/335 |
|---|---|---|---|---|---|
| 5,646,679 | A | * | 7/1997 | Yano et al. | 348/47 |
| 5,710,954 | A | * | 1/1998 | Inoue | 396/374 |
| 5,926,218 | A | * | 7/1999 | Smith | 348/207.99 |
| 6,226,035 | B1 | * | 5/2001 | Korein et al. | 348/335 |
| 6,639,626 | B1 | * | 10/2003 | Kubo et al. | 348/218.1 |
| 6,734,911 | B1 | * | 5/2004 | Lyons | 348/340 |
| 6,961,089 | B2 | * | 11/2005 | Kubo | 348/333.01 |
| 6,968,084 | B2 | * | 11/2005 | Satoh | 382/190 |
| 7,209,175 | B1 | * | 4/2007 | Kurokawa et al. | 348/345 |
| 7,298,564 | B2 | * | 11/2007 | Rouvinen et al. | 359/824 |
| 2002/0041704 | A1 | * | 4/2002 | Yamamoto | 382/154 |
| 2005/0200718 | A1 | * | 9/2005 | Lee | 348/220.1 |

FOREIGN PATENT DOCUMENTS

| JP | 7043605 | 2/1995 |
|---|---|---|
| JP | 2001281530 | 10/2001 |

* cited by examiner

*Primary Examiner*—Tuan V Ho
*Assistant Examiner*—Don Nguyen
(74) *Attorney, Agent, or Firm*—Peyton C. Watkins; Pamela R. Crocker

(57) ABSTRACT

The present invention provides a digital camera which has a plurality of image capturing optical systems and quickly performs automatic focusing. A digital camera includes a first image capturing optical system formed from a lens 2 and a first image sensor, and a second image capturing optical system formed from a lens 3 and a second image sensor. An image processor detects a phase difference between an image of a single subject formed on the first image sensor and an image of the same formed on the second image sensor, in order to perform phase-difference AF. Since the lenses 2, 3 have different focal lengths, the image processor executes correlation operation after having performed conversion processing for causing a scaling factor of the image formed by the first image sensor to coincide with that of the image formed by the second image sensor, to thus detect a phase difference.

10 Claims, 10 Drawing Sheets

US 7,583,308 B2

IMAGE CAPTURING APPARATUS

FIELD OF THE INVENTION

The present invention relates to an image capturing apparatus, and more particularly, to a technique for detecting a distance to a subject in accordance with a parallax obtained by capturing a subject with two image capturing optical systems.

BACKGROUND OF THE INVENTION

Contrast AF and phase-difference AF have been known as automatic focusing (AF) techniques for use with an image capturing apparatus such as a digital camera. Contrast AF is an operation mode for placing a light-receiving sensor in the vicinity of an estimated focal plane, where an image of the subject entering by way of an image capturing lens is to be formed, and in the neighborhood of the estimated focal plane; detecting the amount of defocusing in accordance with a difference in the amounts of light falling on pixels adjacent to the image of the subject; and driving the lens on the basis of this result of detection, to thus bring the subject into focus. The phase-difference AF is an operation mode for detecting the amount and direction of defocus from a difference between phases of images of the subject, which are again formed by two split beams, and actuating the lens to focus on the image of the subject.

Japanese Patent Laid-Open Publication No. Hei 7-43605 discloses a technique for causing a lens to focus by means of performing coarse control through phase-difference AF and fine control through contrast AF.

Japanese Patent No. 3634232 also discloses a technique of combined adoption of phase-difference AF and contrast AF.

Contrast AF detects a peak of contrast by means of "mountain-climbing" or the like, and hence suffers a problem of focusing entailing consumption of time. The phase-difference AF requires a module for detecting a distance, provided separately from an image capturing optical system, which makes the configuration of the camera complex. Consequently, contrast AF and the phase-difference AF have their merits and demerits, and it is necessary to select one conforming to the configuration of a digital camera from the two operation modes.

Characteristics of the digital camera include compact size and a large optical zoom range. The user prefers a wider zoom range to a limited zoom range. However, when the digital camera is provided with a lens of wide zoom range without sacrificing picture quality of a captured image, the digital camera increases in size. An expensive camera, such as an optical single-lens reflex camera, can use a plurality of interchangeable lenses; e.g., a 28 mm to 70 mm zoom lens and a 70 mm to 120 mm zoom lens. However, the compact digital camera imposes an inconvenience on the user.

Accordingly, a conceivable digital camera has a plurality of image capturing optical systems having different focal lengths. However, in such a digital camera, issues arise in relation to how fast and accurately AF is performed.

The object of the present invention is to provide an image capturing apparatus which includes a plurality of image capturing optical systems having different angles of view (or focal lengths) and which can promptly and accurately detect a distance to a subject, to thus quickly perform AF operation.

SUMMARY OF THE INVENTION

The present invention provides an image capturing apparatus comprising: a first image capturing optical system; a second image capturing optical system which is spaced apart from the first image capturing optical system by a predetermined distance and differs from the first image capturing optical system in terms of an angle of field; and computing means which computes a distance to a subject by means of performing correlation operation of a first image captured by the first image capturing optical system and a second image captured by the second image capturing optical system and which executes correlation operation after performance of conversion operation for causing a scaling factor of the first image to coincide with a scaling factor of the second image.

In an embodiment of the present invention, the computing means causes a resolution of the first image to coincide with a resolution of the second image, by means of converting the resolution of at least one of the first and second images.

According to the present invention, a wide zoom range is achieved by provision of a plurality of image capturing optical systems having different angles of field, and AF is quickly performed by use of the plurality of image capturing optical systems, to thus enable capture of the subject's image.

The invention will be more clearly comprehended by reference to the embodiments provided below. However, the scope of the invention is not limited to the embodiments.

DETAILED DESCRIPTION OF THE INVENTION

An embodiment of the present invention will be described herein below by reference to the drawings.

Figure 1:
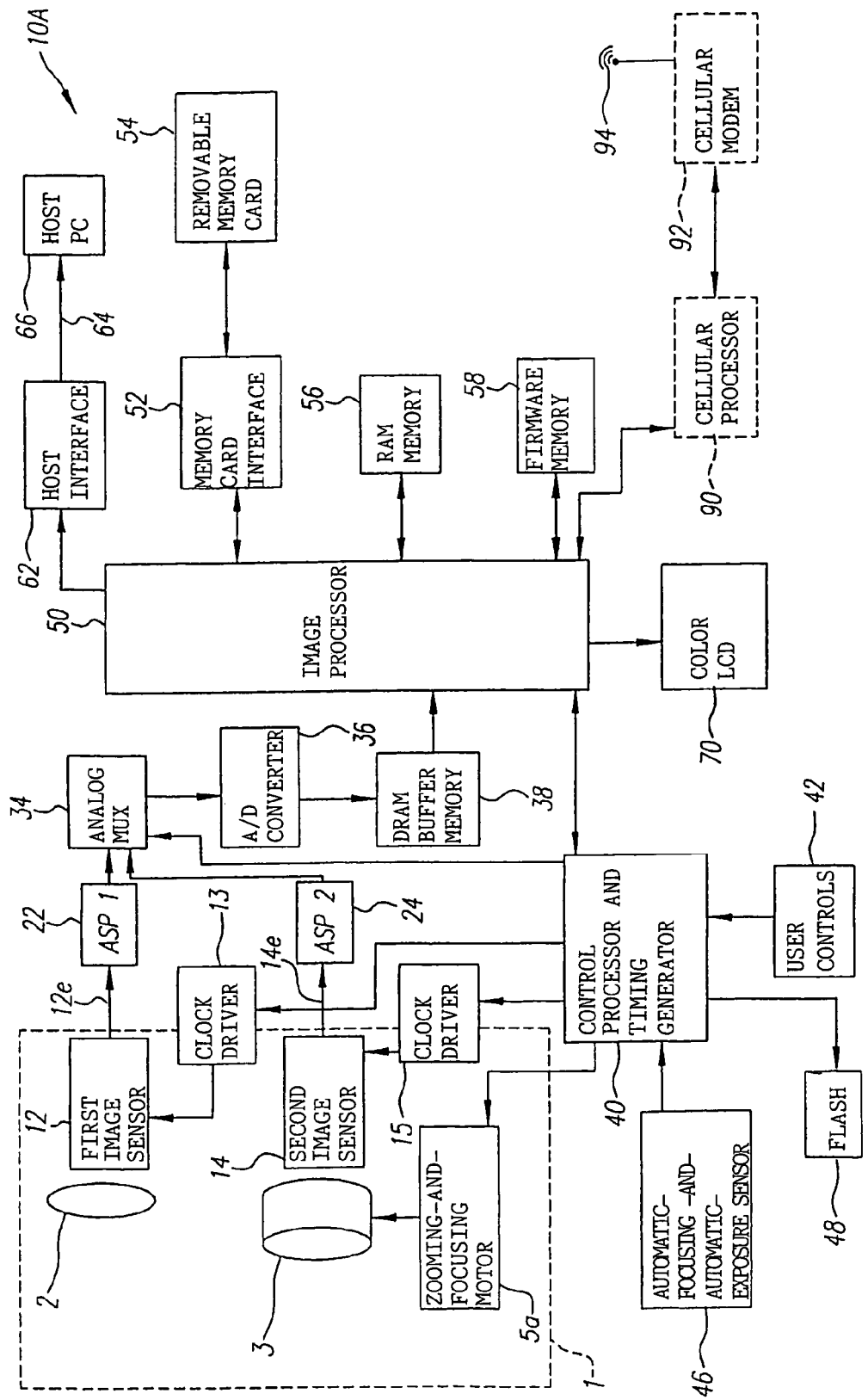
FIG. 1 is a configuration block diagram of a digital camera.

FIG. 1 is a configuration block diagram of a digital camera 10A according to an embodiment of the present invention. The digital camera 10A is a portable, battery-driven camera. The digital camera 10A generates a still digital image to be stored in a removable memory card 54. The digital camera 10A may generate a digital motion picture in addition to generating a still picture or alternative to a still picture. The digital motion picture is also stored in the memory card 54 in the same manner.

The digital camera 10A includes an image capturing assembly 1, and the image capturing assembly 1 includes a fixed focus lens 2 used for forming an image of a scene on a first image sensor 12 and a zoom lens 3 used for forming the image of the scene on a second image sensor 14. The image capturing assembly 1 provides a first image output signal 12e from the first image sensor 12 and a second image output signal 14e from the second image sensor 14. The image sensors 12, 14 have the same aspect ratio and pixel size; the lens 2 is a super wide-angle lens having a focal length of 22 mm, which is converted by a 35 mm film, and the zoom lens 3 is a zoom lens having a focal length of 40-120 mm.

A focal length (f.l.), which is converted by the 35 mm film, is computed by the following equation. Focal length converted by the 35 mm film=[actual focal length (mm)×43.27 mm]/[a distance to a focal plane along a diagonal line (mm)]

The focal length of the fixed lens 2 provides a 22 mm super-wide field of view, and focuses on a subject at a distance of 4 feet to infinity. Accordingly, the fixed lens 2 does not require focus adjustment. The fixed focus lens 2 includes an aperture-and-shutter assembly which controls exposure light on the image sensor 12. The zoom lens 3 is driven by a zooming-and-focusing motor 5a, and includes an aperture-and-shutter assembly that controls exposure light on the image sensor 14.

Each of the image sensors 12, 14 is a single-chip color megapixel CCD sensor, and uses a known Bayer color filter for capturing a color image. Each of the image sensors 12, 14 has a 4:3 image aspect ratio, 3.1 effective megapixels, and 2048×1536 pixels.

A control processor/timing generator 40 supplies a signal to a clock driver 13, to thus control the first image sensor 12. The control processor/ timing generator 40 supplies a signal to a clock driver 15, to thus control the second image sensor 14. The control processor/timing generator 40 control the zooming-and-focusing motor 5a and a flash 48 used for illuminating a scene. The control processor/timing generator 40 receives a signal from an automatic-focusing-and-automatic-exposure sensor 46. The image sensor 14 can be used in lieu of the automatic-focusing-and-automatic-exposure sensor 46 for detecting exposure light and TTL automatic focusing. User controls 42 are used for controlling operation of the digital camera 10A.

The analog output signal 12e from the first image sensor 12 is amplified by a first analog signal processor (ASP1) 22, and is supplied to a control element 34; that is, to a first input of an analog multiplexer control element. The second analog output signal 14e from the second image sensor 14 is amplified by a second analog signal processor (ASP2) 24, and is supplied to a second input of the control element 34. The function of the control element 34 is to select one from the first sensor output signal 12e from the first image sensor 12 and the second sensor output signal 14e from the second image sensor 14, and to supply the sensor output signal selected by the image capturing assembly 1 to a component in a subsequent stage.

The control processor/timing generator 40 controls the analog multiplexer control element 34 in order to supply any one of the output signal from the first analog signal processor (ASP1) 22 and the output signal from the second analog signal processor (ASP2) 24 to an analog-to-digital (A/D) conversion circuit 36. Digital data supplied from the A/D converter 36 are stored in DRAM buffer memory 38, and are further processed by an image processor 50. Processing executed by the image processor 50 is controlled by firmware stored in firmware memory 58 formed from flash EPROM memory. The processor 50 processes an input digital image file, and the input digital image file is stored in RAM memory 56 in a processing stage.

Two A/D conversion circuits may be connected to outputs of the (ASP1) 22 and the (ASP2) 24, respectively. In this case, the analog MUX 34 is obviated. In place of the analog MUX, a digital multiplexer is used for selecting any of the outputs from the A/D conversion circuits.

The digital image file processed by the image processor 50 is supplied to a memory card interface 52, and the interface 52 stores the digital image file into the removable memory card 54. The memory card 54 is one type of a digital image storage medium, and can be utilized in several different physical formats. For instance, the memory card 54 can be applied to a known format; for example, compact flash (Registered Trademark), smart media, a memory stick, an MMC, an SD, and an XD memory card format. The memory card can also be used in another form; e.g., a magnetic hard drive, a magnetic tape, or an optical disk. Alternatively, the digital camera 10A may employ built-in nonvolatile memory, such as flash EPROM or the like. In such a case, the memory card interface 52 and the memory card 54 are not required.

The image processor 50 has various housekeeping functions and image processing functions. These functions include color interpolation, involving color correction and tone correction, for generating sRGB image data. The sRGB image data are then subjected to JPEG compression, and the thus-compressed data are stored in the memory card 54 as JPEG image data. The sRGB image data are supplied to a host PC 66, as well, by way of a host interface 62 such as an SCSI connection, a USB connection, a FireWire connection, or the like. The JPEG file employs a so-called "Exif" image format.

The image processor 50 is a typical programmable image processor, but may be a hybrid of a hard-connected custom integrated circuit processor, a general-purpose microprocessor, a hard-connected custom IC, and a programmable processor.

The image processor 50 also generates a low-resolution thumbnail image. After an image has been captured, a thumbnail image is displayed on a color LCD 70. A graphical user interface appearing on the color LCD 70 is controlled by the user controls 42.

The digital camera 10A may be included in a portion of a camera phone. In such an embodiment, the image processor 50 is connected to a cellular processor 90, and the cellular processor 90 uses a cellular modem 92 to transmit a digital image to a cellular network through use of radio transmission by way of an antenna 94. The image capturing assembly 1 may be an integrated assembly including the lenses 2, 3, the image sensors 12, 14, and the zooming-and-focusing motor 5a. In addition, the clock drivers 13, 15, the analog signal processors 22, 24, the analog MUX 34, and the A/D converter 36 may be formed as portions of the integrated assembly.

Figure 2A:
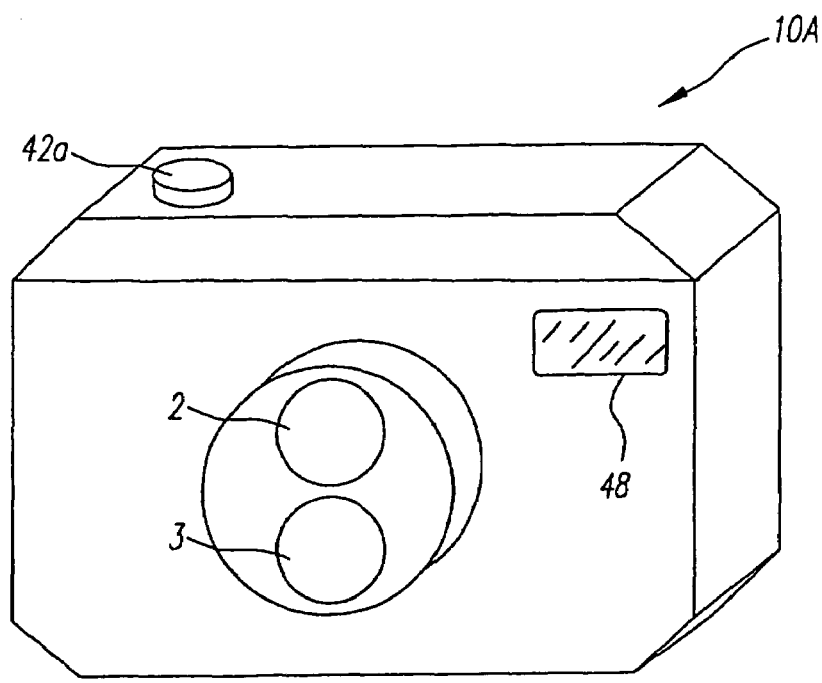
FIG. 2A is a perspective view of the digital camera when viewed from the front.
Figure 2B:
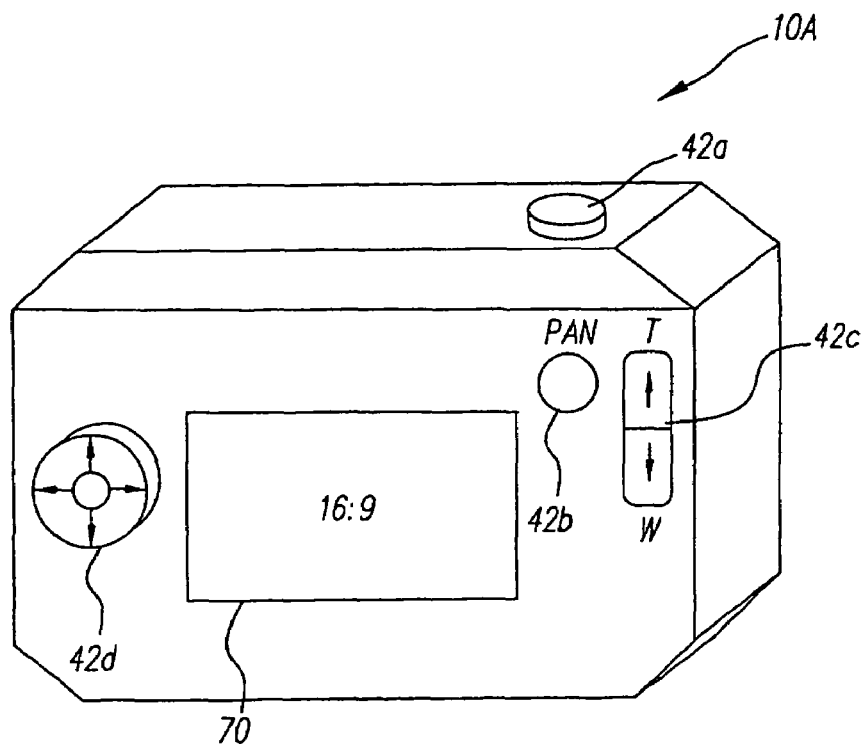
FIG. 2B is a perspective view of the digital camera when viewed from the back.

FIGS. 2A and 2B are perspective views of the digital camera 10A. FIG. 2A is a view of the digital camera 10A when viewed from the front, showing the fixed focus lens 2, the zoom lens 3, and the flash 48. The fixed focus lens 2 is a super-wide-angle lens, and has a focal length of 22 mm and a maximum f/2 aperture. The zoom lens 3 is a super-thin lens; namely, a prism lens, and has a focus length of 40-120 mm (converted). The prism lens has a prism for a curvature optical path, and a very thin optical configuration is produced by means of this prism. FIG. 2B is a view of the digital camera 10A when viewed from the back, showing the color LCD 70 and the plurality of user controls 42. The user controls 42 include a shutter button 42a which enables an image capturing sequence, a panorama button 42b which enables a panorama mode, a zoom button 42c which enables zoom setting, and a multiposition selector 42d to be operated by way of an image or a menu selection on the color LCD 70.

The aspect ratio of an image obtained by means of the fixed focus lens 2 and the image sensor 12 may differ from that of an image obtained by means of the zoom lens 3 and the image sensor 14. For instance, the image sensor 12 can be configured to have a 16:9 aspect ratio, 2730×1530 pixels, and 4.2 effective megapixels. The LCD 70 can be configured to have a wide aspect ratio (e.g., 16:9). The aspect ratio of the image sensor 12 represents a panorama image (a panorama image of 16:9 aspect ratio), and the aspect ratio of the image sensor 14 represents a typical aspect ratio image of a television set (an image having a 4:3 aspect ratio). In this case, the user controls 42 input a user command to the control processor/timing generator 40, to thus change the aspect ratio of the image supplied and stored by the image sensor 12, in order to yield a variable panoramic effect of narrowing the aspect ratio achieved at the fixed focus lens (the wide lens) 2 to the 4:3 aspect ratio of the zoom lens 3. This is achieved by means of cutting the image data stored in the DRAM buffer memory 38, and only the center portion of the image data sent from the image sensor 12 is processed by the image processor 50 and stored in the memory card 54. As a result of, e.g., the user pressing a wide control section of the zoom button 42c, the vertical margin of the image is continuously adjusted from a normal 16:9 aspect ratio to a wider aspect ratio. Accordingly, the upper end and lower end of the image in the DRAM buffer memory 38 are cut by the image processor 50, whereby a wider aspect ratio, such as a 17:9 aspect ratio, an 18:9 (2:1) aspect ratio, a 19:9 aspect ratio, or the like, is generated. Alternatively, the horizontal margin of the image is adjusted from the 16:9 aspect ratio to a narrower aspect ratio by means of the user pressing a telephoto control section of the zoom button 42c. Accordingly, the left and right ends of the image in the DRAM buffer memory 38 are cut by the image processor 50, to thus generate a narrower aspect ratio such as a 15:9 aspect ratio, a 14:9 aspect ratio, a 3:2 aspect ratio, or the like. Thus, a variable panoramic effect is digitally obtained by use of the image data supplied from the first image sensor 12.

Figure 3:
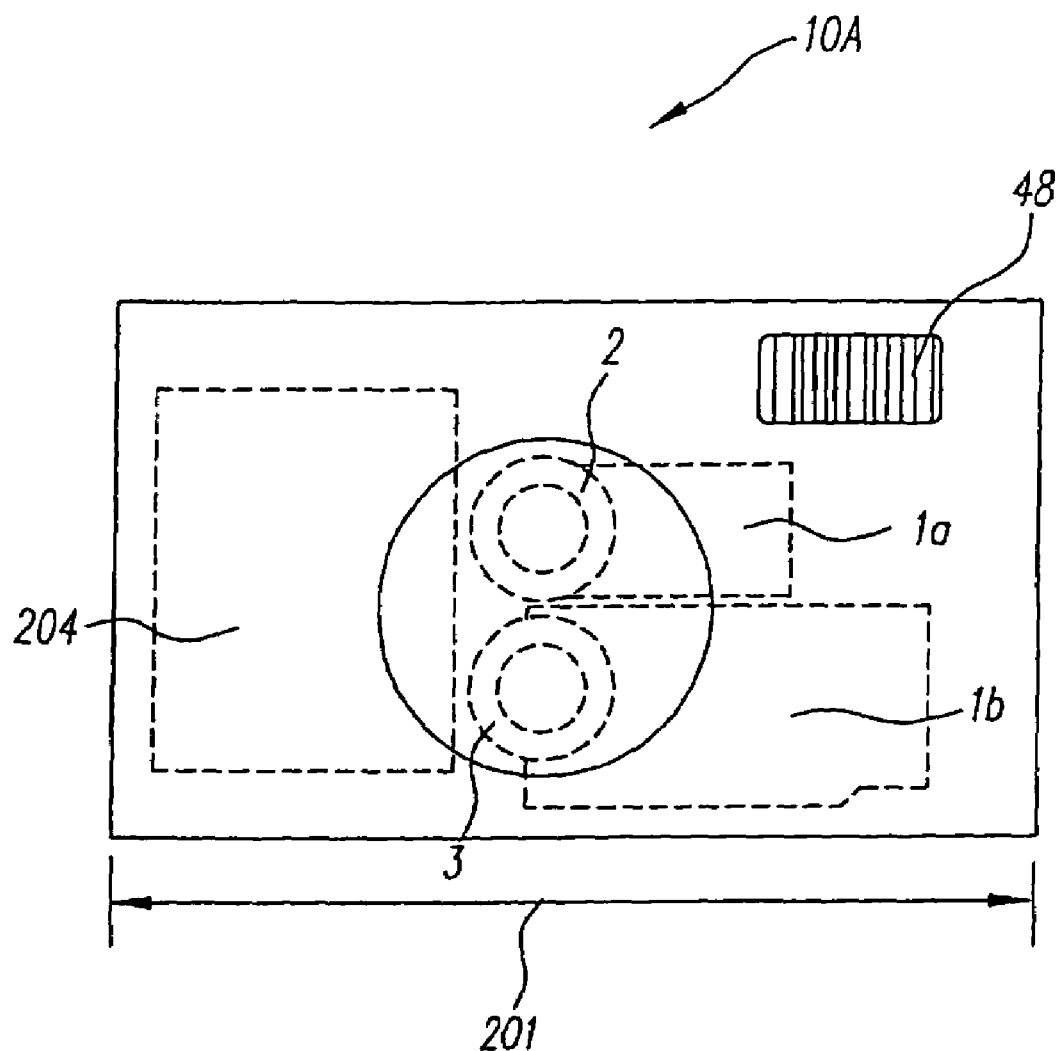
FIG. 3 is a front view of the digital camera.

FIG. 3 shows an internal layout view of the digital camera 10A. FIG. 3 is a front view of the digital camera 10A, showing how a fixed focus lens sub-assembly 1a and a zoom lens sub-assembly 1b are situated to one side of the lenses 2, 3 and below the electronic flash 48. A battery section 204 is situated to the other side of the lenses 2, 3.

As mentioned above, when the digital camera 10A, which has the fixed focus lens 2 and the zoom lens 3, has captured a single subject through use of the fixed focus lens 2 and the zoom lens 3, an image of the single subject is formed at different positions on the first image sensor 12 and the second image sensor 14, because of parallax. Consequently, the digital camera 10A of the embodiment does not need to be newly provided with a distance detection module for phase-difference AF, and enables phase-difference AF through use of the first image capturing optical system formed from the existing fixed focus lens 2 and the first image sensor 12 and the second image capturing optical system formed from the zoom lens 3 and the second image sensor 14.

Figure 4:
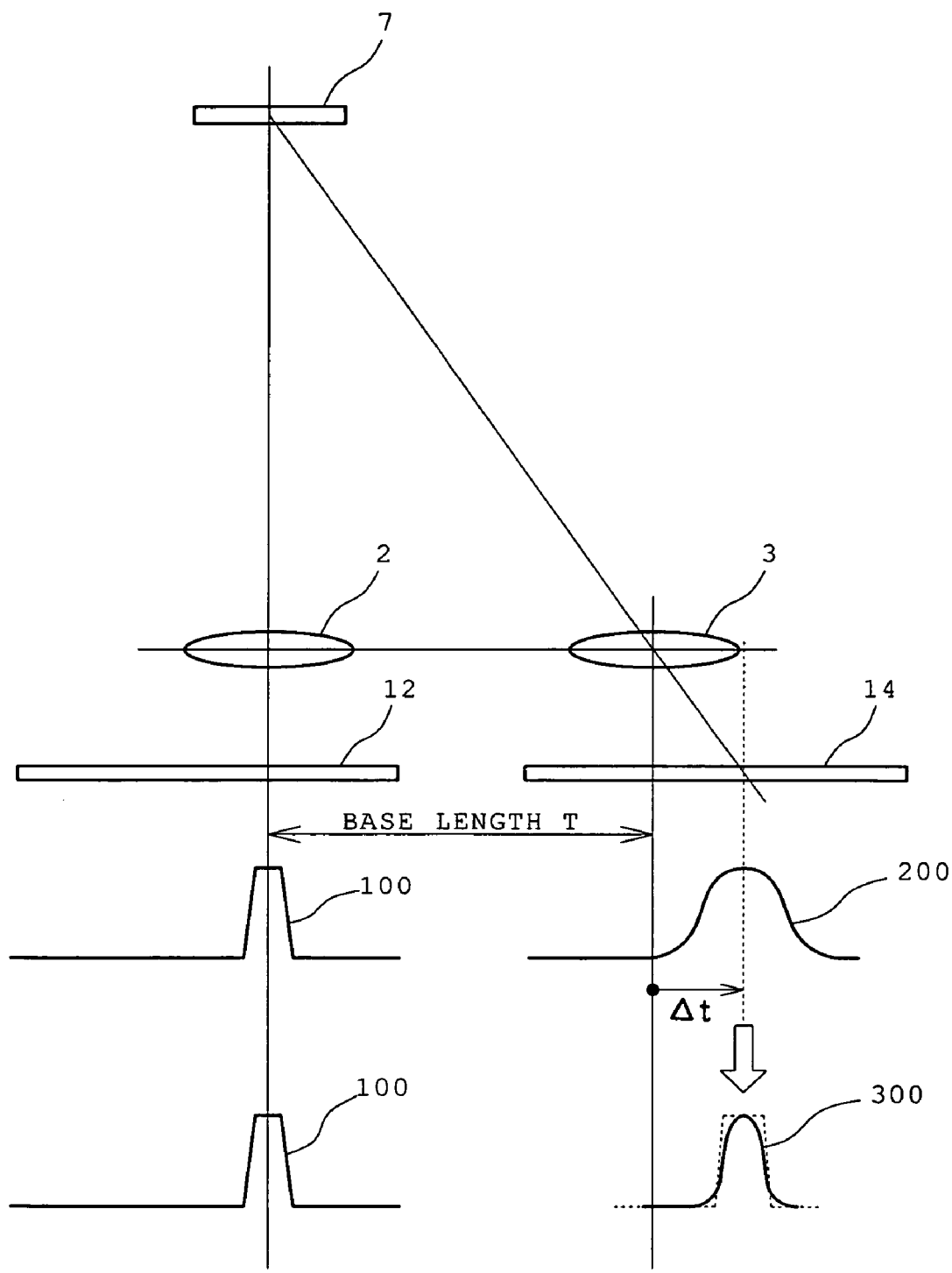
FIG. 4 is a descriptive view of detection of a distance through use of two image capturing optical systems.

FIG. 4 diagrammatically shows a distance detection method of the present embodiment. The light reflected from a subject 7 is collected by the fixed focus lens 2, to thus form an image of the subject on the first image sensor 12. In the image of the subject, a portion of interest is taken as an image 100. Since the fixed focus lens 2 has a great depth of field, a comparatively-focused, clear image 100 is obtained. Meanwhile, the light reflected from the subject 7 is collected by the zoom lens 3, as well, whereupon the image of the subject is formed on the second image sensor 14. In the image of the subject, a portion of interest is taken as an image 200. Since the zoom lens 3 has not yet been focused, the image 200 may be blurred. The essential requirement is that, of the image formed on the second image sensor 14, an image corresponding to the image 100 is clear enough to enable determination thereof. The image does not need to be focused. The position of the image 100 on the first image sensor 12 and the position of the image 200 on the second image sensor 14 change according to a distance to the subject 7 and a distance between the two lenses 2, 3; namely, a base length T. Consequently, a difference between the position of the image 100 and the position of the image 200 is detected by means of known correlation operation by reference to the known base length T, to thus be able to detect the distance to the subject 7.

Since the focal length f1 of the fixed focus lens 2 and the focal length f2 of the zoom lens 3 differ from each other, the scaling factor for the image 100 differs from the scaling factor for the image 200, and correlation operation is difficult to perform. In FIG. 4, since the scaling factor for the image 100 and the scaling factor for the image 200 differ from each other, attention must be paid to a difference between the shape of the image 100 and that of the image 200.

When performing correlation operation of the first image output from the first image sensor 12 and the second image output from the second image sensor 14, the image processor 50 executes conversion processing to cause the scaling factor of the first image to coincide with that of the second image prior to performing the correlation function. Specifically, the second image is subjected to conversion processing (resolution conversion processing), where the image is multiplied by f1/f2, to thus convert the image 200 into an image 300. After the image 200 has been converted into the image 300, correlation operation processing of the image 100 and the image 300 is performed, to thus detect a phase difference and compute a distance to the subject 7. The image processor 50 may multiply the first image by f2/f1, to thus cause the scaling factor of the image 100 to coincide with that of the image 200. If necessary, the image processor 50 may subject both the first and second images to conversion processing, to thus cause the scaling factor of the first image to coincide with that of the second image. For instance, the first image is multiplied by f3/f1, and the second image is multiplied by f3/f2, or the like. Subjecting the two images to conversion processing becomes complicated, and hence subjecting either one of the images to conversion processing is preferable. The control processor and timing generator 40 supplies either one of the first image output from the first image sensor 12 and the second image output from the second image sensor 14 to the image processor 50 during photographing operation. However, when phase-difference AF is effected, both the first and second images are supplied to the image processor 50. The focus positions (default focusing positions) of the lenses 2, 3 can be set to arbitrary positions until the distance to the subject 7 is computed. In order to obtain the clear images 100 and 200, the focus positions of the lenses 2, 3 are preferably set to optimal positions. The default focus positions of the lenses 2, 3 can be set to the same value. However, so long as the focus positions of the lenses 2, 3 are set to median values within a focus movement range, the lenses can capture an image of the subject located in an arbitrary position.

Figure 5:
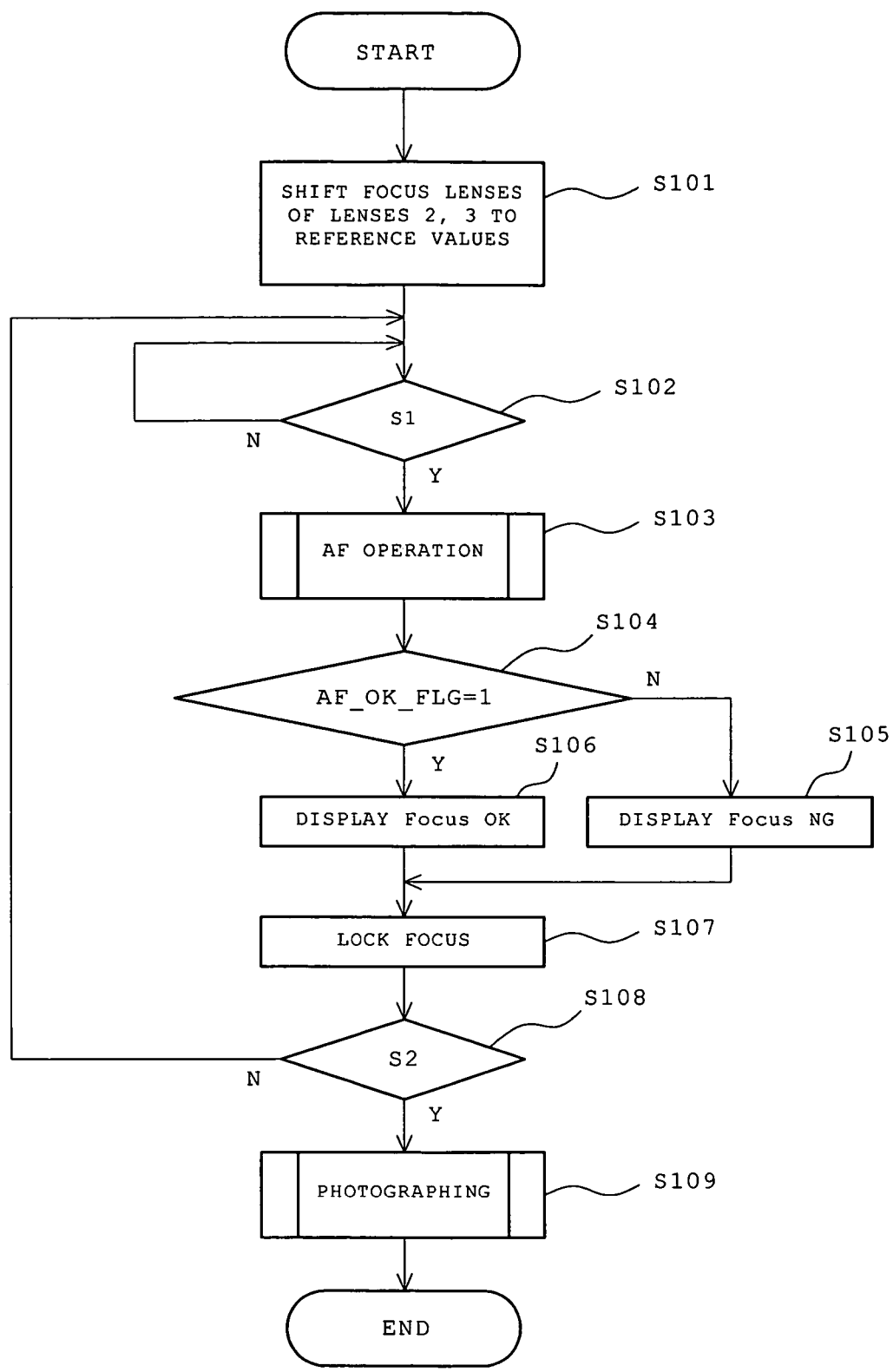
FIG. 5 is a flowchart of overall processing of the digital camera according to an embodiment of the present invention.

FIG. 5 shows an overall processing flowchart of the present embodiment. When power of the digital camera 10A is turned on, the control processor and timing generator 40 drives the zooming-and-focusing motor 5a, thereby moving the focus positions of the lenses 2 and 3 to reference values (S101). The reference values are set to, e.g., a median value within the moving range of the focus lens.

After the focus positions of the lenses 2, 3 have been set to respective reference values (default positions), a determination is made as to whether or not the user has pressed the shutter button 42a halfway (state of S1) (S102). When the user has pressed the shutter button 42a halfway (S1), AF operation to be described later is performed (S103). The AF operation is AF which uses a phase difference existing between the first image output from the first image sensor 12 and the second image from the second image sensor 14 and which includes conversion operation and correlation operation performed by the image processor 50. When the distance to the subject 7 has been computed by means of conversion operation and correlation operation, a flag of AFOK is set to 1. When for any reason the distance is not computed (e.g., when correlation of two images is not effected), the AFOK flag is set to 0. When the AFOK flag is set to 0, the image processor 50 or the control processor and timing generator 40 displays on the LCD 70 a message of "Focus NG," which means that focus cannot be achieved (S105). When the AFOK flag is set to 1, a message of "Focus OK" appears on the LCD 70 (S106), and the current focus position is locked (S107). A determination is made as to whether or not the user has pressed the shutter button 42a all the way down (the state of S2) with the focus being locked (S108). When the user has pushed the shutter button 42a all the way down, the subject 7 is photographed with the locked focus (S109). A determination as to whether photographing is performed with use of the first image capturing optical system consisting of the lens 2 and the first image sensor 12 or the second image capturing optical system consisting of the lens 3 and the second image sensor 14 is made according to the user's operation of the zoom button 42c. When the user has actuated the zoom button 42c to the "telephoto" position to thus select the lens 3 and the second image sensor 14, the zooming-and-focusing motor 5a adjusts the focus position of the lens 3 by means of AF operation pertaining to S103, and photographing is performed. The second image formed by the second image sensor 14 is processed by the image processor 50, and the thus-processed image is stored in the memory card 54.

Figure 6:
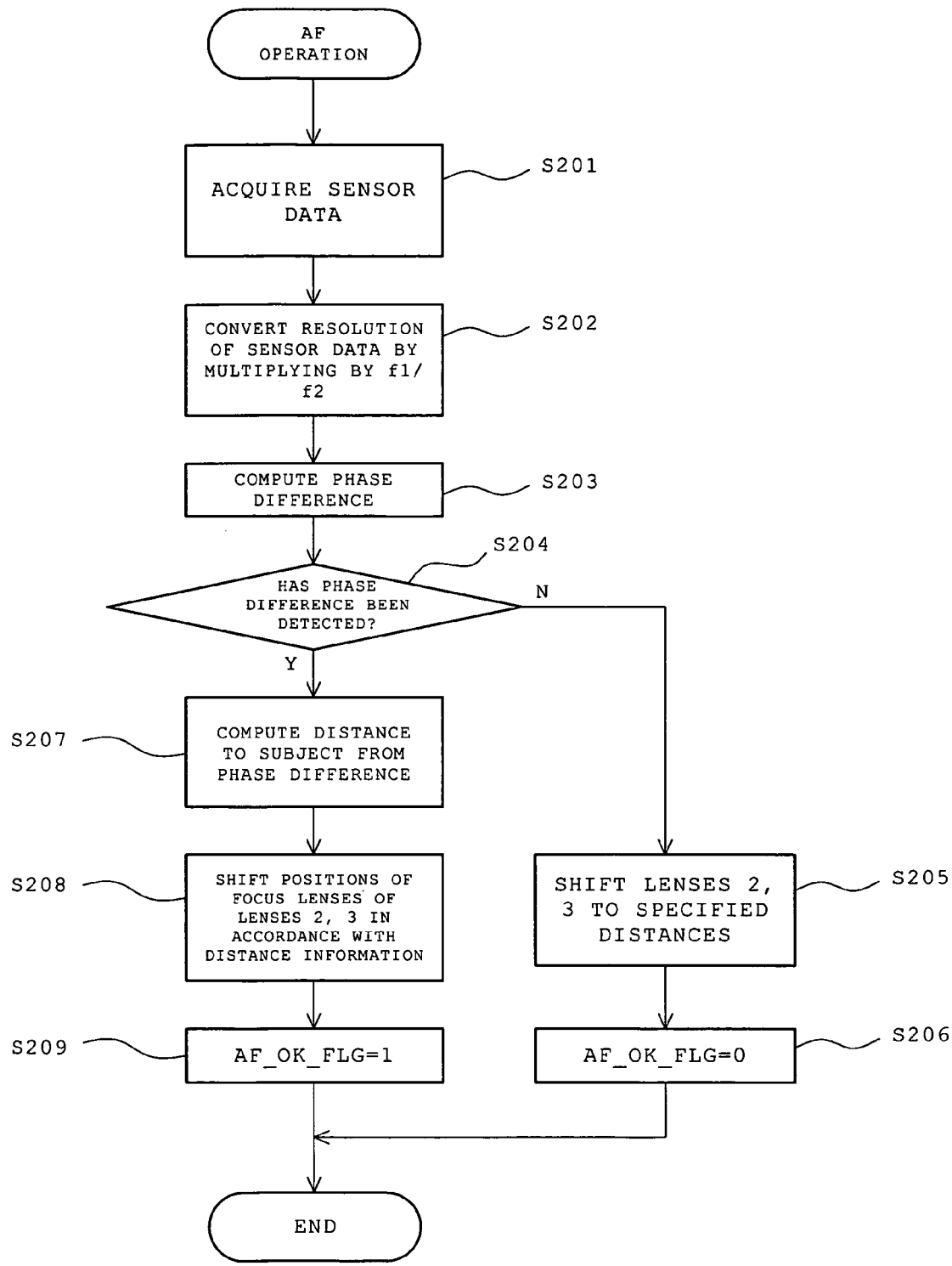
FIG. 6 is a flowchart of detailed processing of AF operation shown in FIG. 5.

FIG. 6 shows a detailed flowchart of AF operation pertaining to processing step S103 shown in FIG. 5. The image processor 50 acquires the image data, which have been captured by the first image sensor 12 and the second image sensor 14 (S201), and converts the resolution of the image data (second image data) from the second image sensor 14 by multiplying by f1/f2 (S202). Specifically, the second image data are horizontally compressed by f1/f2, where f1 is known, and f2 is acquired from a zoom encoder provided for the lens 3. As a matter of course, f2 may be acquired from the zoom button 42c operated by the user. After the first image has been converted into the second image, correlation operation between the first image and the converted second image is performed to thus compute a phase difference (S203). Through correlation operation, a correlation value between "n" pixels forming the image 100 of the first image and "n" pixels forming the image 300 of the second image is computed for each corresponding pixel. Next, the "n" pixels of the image 100 of the first image are shifted by one pixel, to thus again compute a correlation value of the "n" pixels of the image 300 of the second image for each corresponding pixel. Processing is repeatedly performed, and the amount of shift, by means of which the correlation value assumes a maximum value, is taken as a phase difference between the image 100 and the image 300. The correlation value is defined as, e.g., a total sum of absolute values of differences between corresponding pixels.

As mentioned above, a determination is made as to whether or not the phase difference has been detected (S204). When the phase difference cannot be detected, the lenses 2, 3 are moved to the reference values (S205), and the AFOK flag is set to 0 (S206). In this case, as described in connection with FIG. 5, the message of Focus NG appears on the LCD 70. When the phase difference has been detected, the image processor 50 computes a distance to the subject 7 from the detected phase difference (S207). The thus-computed distance information is supplied to the control processor and timing generator 40. As a matter of course, the control processor and timing generator 40 rather than the image processor 50 may execute conversion operation and correlation operation. The control processor and timing generator 40 shifts the focus positions of the lenses 2, 3 in accordance with the distance information (S208). The AFOK flag is set to 1 (S209). As mentioned above, phase-difference AK is executed through use of the two image capturing optical systems.

Figure 7:
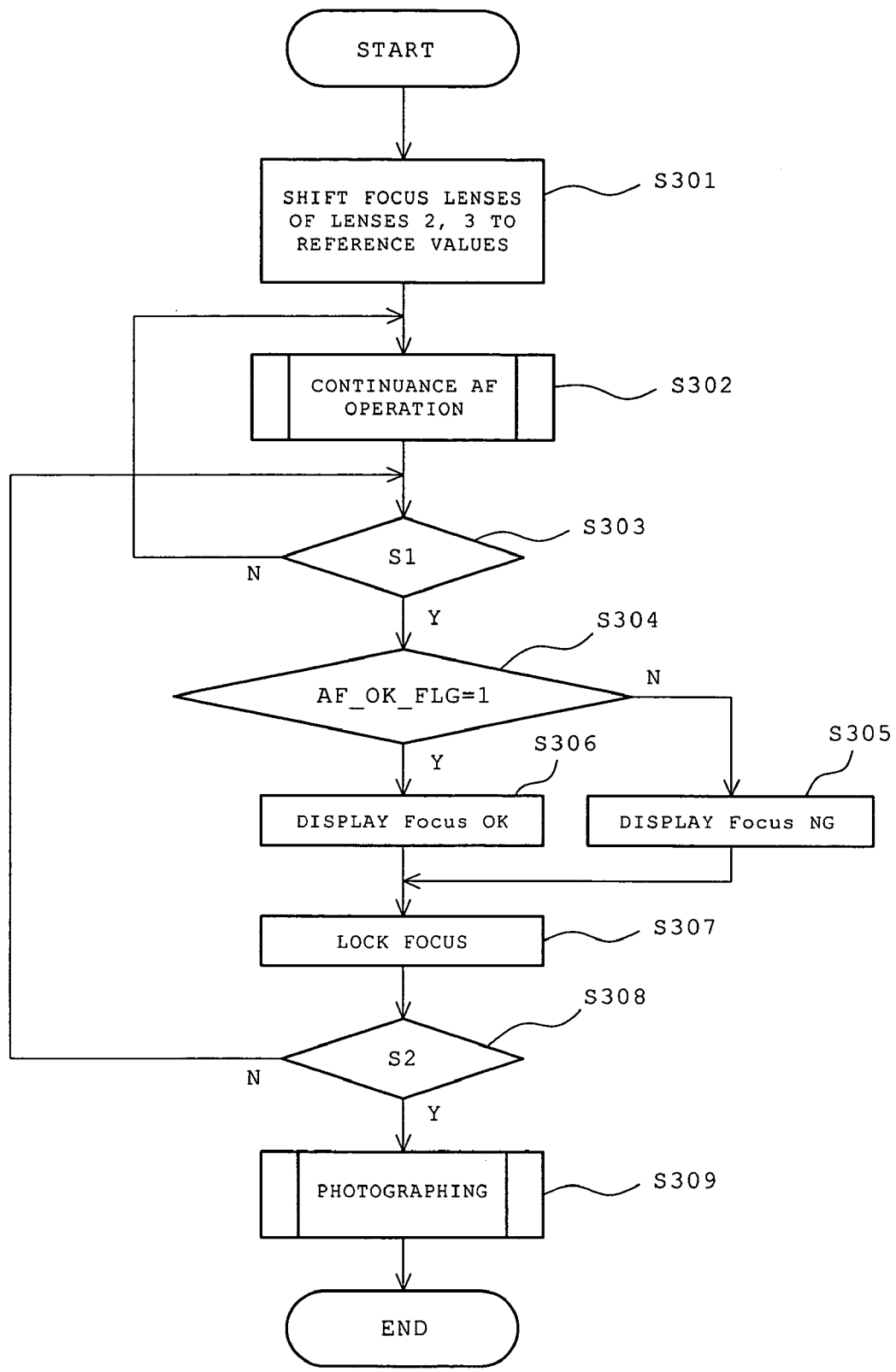
FIG. 7 is a flowchart of overall processing of a digital camera according to another embodiment of the present invention.

FIG. 7 shows a flowchart of overall processing according to another embodiment of the present invention. In the embodiment shown in FIG. 5, phase-difference AF is executed by means of shifting the positions of the focus lenses of the lenses 2, 3 to reference values. Needless to say, the lens position of the focus lens can be computed more accurately as the lens position becomes closer to the appropriate lens position related to the distance to the subject 7. In FIG. 7, the AF operation shown in FIG. 6 is repeatedly performed, to thus update the reference values in S101. Specifically, the focus lenses of the lenses 2, 3 are shifted to the reference values (S301), and continuance AF operation shown in FIG. 6, where AF operation is repeatedly performed, is executed (S302). Next, a determination is made as to whether or not the user has pushed the shutter button 42a halfway (the state of S1) (S303). When the user has pushed the shutter button halfway, a determination is made as to whether or not the AFOK flag has already been set to 1 (S304). When the subject 7 has already been captured through continuance AF, the message of Focus OK appears on the LCD 70 (S306), and focus is locked (S307). When the AFOK flag is not set to 1 as a result of continuance AF, the message of focus NG appears on the LCD 70 (S305). After the focus has been locked, a determination is made as to whether or not the user has pushed the shutter button 42a all the way (the state of S2) (S308). When the shutter button has been pushed all the way, the subject 7 is photographed with the locked focus (S309). Since AF is always executed, by means of continuance AF, before the shutter button 42a is pressed halfway, processing, which would be executed after the shutter button 42a has been pushed halfway, is speeded up. Namely, photographing does not entail occurrence of a time lag, and photographing which ensures a shutter chance becomes feasible.

Although the embodiment of the present invention has been described thus far, the present invention is not limited to the embodiment, and another embodiment is also possible. For instance, in the present embodiment, the lens 2 is set to a fixed focal lens, and the lens 3 is taken as the zoom lens. However, the lenses 2, 3 can also be taken as zoom lenses having different ranges of variable focal length.

In the present embodiment, the zoom lens 3 has not yet been focused, and therefore the image 200 may be blurred. However, the essential requirement is that the image 200 is clear enough to enable determination of an image corresponding to the image 100 in the image formed on the second image sensor 14. However, focus adjustment may be performed to a certain extent in order to perform correlation operation more reliably. For instance, when the image formed on the second image sensor 14 has low contrast due to being out of focus, focus may be coarsely adjusted to such an extent that correlation operation can be executed by performing known mountain-climbing AF.

Figure 8:
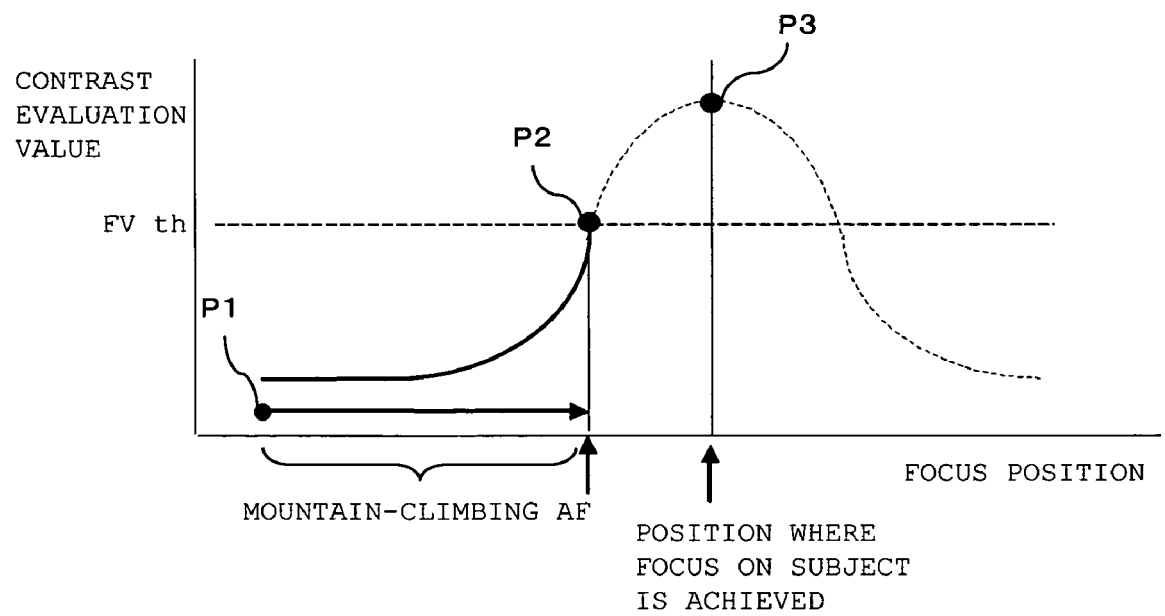
FIG. 8 is a descriptive view showing a combination of mountain-climbing AF and correlation operation.

FIG. 8 shows processing to be performed for a combination of mountain-climbing AF with correlation operation. In the drawing, the horizontal axis represents a focus position, and the vertical axis represents a contrast evaluation value of an image formed on the second image sensor 14. When the focus position of the second image sensor 14 is P1 upon commencement of processing, a contrast evaluation value FVth, which can be subjected to correlation operation, has not yet been achieved, and therefore focus is coarsely adjusted by performing mountain-climbing AF. Specifically, detection of the edge of the image on the second image sensor 14 is first performed, to thus compare the obtained contrast evaluation value with the predetermined reference value FVth. When the detected contrast evaluation value has not yet come to the reference value FVth, mountain-climbing AF processing is performed, to thus coarsely adjust focus. Photographing and contrast evaluation are repeatedly performed (TTL and mountain-climbing AF), and mountain-climbing AF is terminated at a point in time when the contrast evaluation value has reached the reference value FVth (position P2 in the drawing). In subsequent steps, correlation operation is executed to thus compute a distance to the subject, and the zoom lens 3 is controlled to a focus position (position P3 in the drawing).

Although in the present embodiment a lateral phase difference is computed through correlation operation, correlation operation may be executed by dividing an image into two-dimensional areas. Thereby, a feature of the image is captured in a scene, such as a repeated pattern or the like, where the feature cannot be computed by means of the phase-difference method, thereby enabling accurate measurement of a distance.

Figure 9:
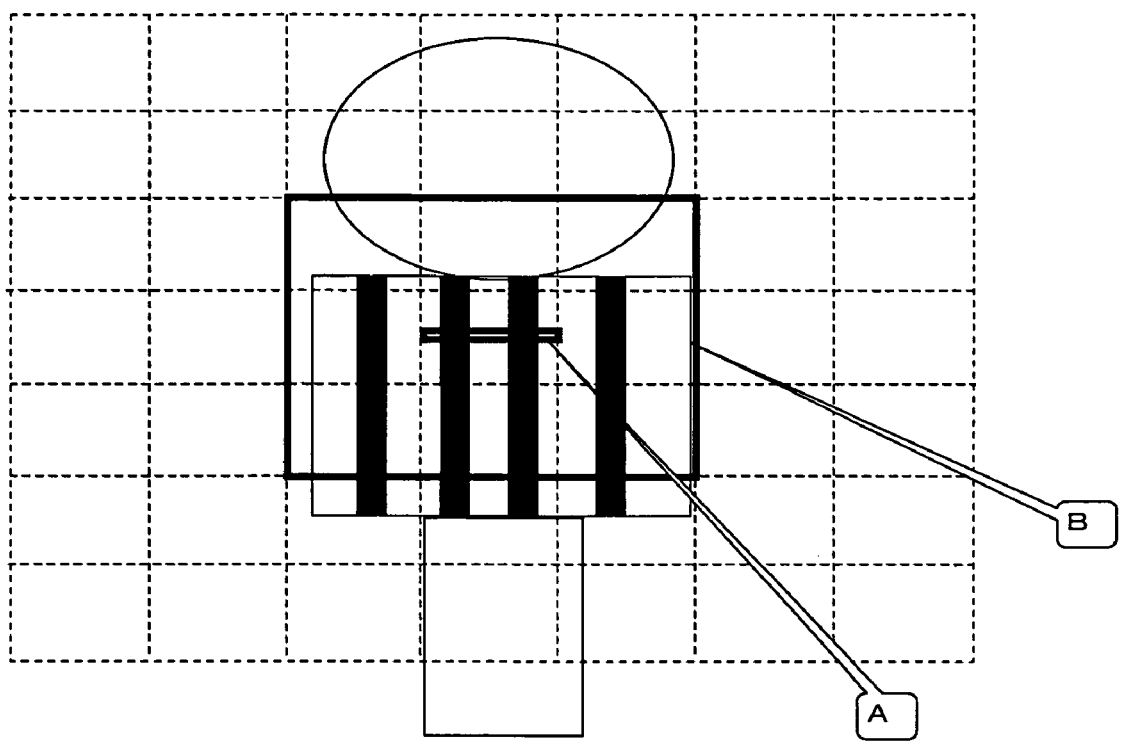
FIG. 9 is a descriptive view showing correlation operation in a two-dimensional area.

FIG. 9 shows a case where a person wearing a shirt with vertical lines is taken as a subject. In such a scene, when lateral correlation is determined in, e.g., area A of the drawing, false recognition arises in detection of a phase difference, which is performed by detection of a difference, because of repetition of stripes. In this case, a plurality of peaks of the absolute value of a difference exist as correlation values, and the subject can be deemed to have a repeated pattern. As in area B in the drawing, on the assumption that an area to be measured is two-dimensional, lateral and longitudinal correlation is determined. FIG. 9 shows only one of the two image capturing optical systems. However, the area B is simultaneously detected in the other image, and correlation operation of the area is executed in relation to the lateral and longitudinal directions. The degree of a difference between the areas B captured by the two image capturing optical systems may be detected by means of pattern matching.

In a case where subjects are present at a plurality of distances when two-dimensional correlation operation is performed, an area to be measured is provided in numbers within the screen, so that optimum photographing becomes feasible.

Figure 10:
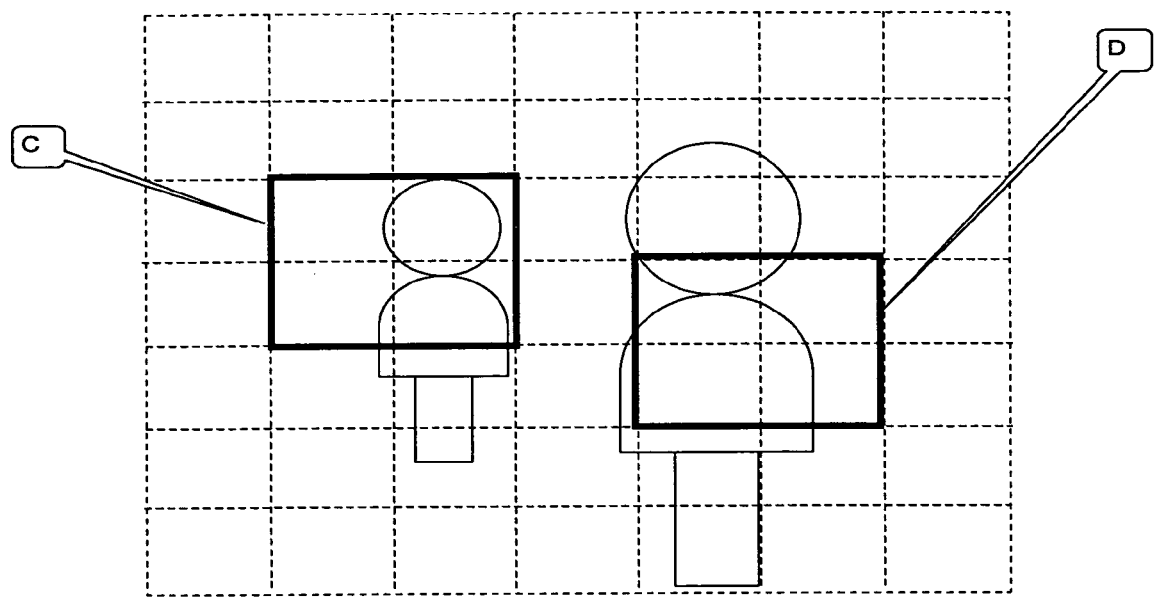
FIG. 10 is a descriptive view showing correlation operation in a plurality of two-dimensional areas.

FIG. 10 shows an example of the scene where a plurality of subjects are present. Contrast evaluation values are computed from all areas, to thus determine whether or not the contrast evaluation values are greater than a reference value. There are selected areas whose contrast evaluation values are determined to be greater than the reference value and which are determined to enable correlation operation, and a distance to the subject is computed in relation to the thus-selected areas by means of correlation operation. FIG. 10 shows a case where area C and area D are determined to be measured. Contrast data pertaining to the selected areas C and D are computed from the two image capturing optical systems, and correlation operation and computation of a distance to the subject are performed. Of the computed values, the value showing the closest distance is set as a photographing distance, so that photographing matching a photographer's intention becomes practicable.

When a characteristic area exists in the screen, utilization of this characteristic area is also preferable. This will be described by means of taking a person, especially the face of a person, as an example of the characteristic area. When the subject obviously includes a person as in the case of photographing a portrait, the face of the person is detected from at least either the first image of the first image sensor 12 or the second image of the second image sensor 14. The algorithm for ascertaining the face is known, and the face is detected on the basis of a skin color, a hair color, the position of eyeglasses, and the like. After detection of the face, the scaling factor of the first image and that of the second image are converted so as to attain a predetermined scaling factor, which is considered to be most suitable as the scaling factor of the face, and the thus-converted image may be subjected to correlation operation. When the subject includes flowers during close-up photographing, it is better to take the flowers as the characteristic area.

PARTS LIST 1 image capturing assembly
1a lens sub-assembly
1b lens sub-assembly
2 fixed focus lens
3 zoom lens
5a zooming and focusing motor
7 subject
10A digital camera
12 first image sensor
12e first image output signal
13 clock driver
14 second image sensor
14e second image output signal
15 clock driver
22 first analog signal processor
24 second analog signal processor
34 control element
36 A/D conversion circuit
38 DRAM buffer memory
40 processor/timing generator
42 user controls
42a shutter button
42b panorama button
42c zoom button
42d multiposition selector
46 exposure sensor
48 flash
50 image processor
52 memory card interface
54 memory card
56 RAM memory
58 firmware memory
62 host interface
66 host PC
70 color LCD
90 cellular processor
92 cellular modem
94 antenna
100 clear image
200 image
204 battery section
300 image

What is claimed is:

1. An image capturing apparatus comprising:

a first image capturing optical system which generates a first image output signal;

a second image capturing optical system which is spaced apart from the first image capturing optical system by a predetermined distance and differs from the first image capturing optical system in terms of an angle of field which generates a second image object signal;

conversion mechanism which performs conversion operation for causing a scaling factor of the first image to coincide with a scaling factor of the second image; and distance computing mechanism which computes a distance to a subject by means of performing correlation operation of a first image and the second image after the conversion mechanism performs the conversion operation.

2. The image capturing apparatus according to claim 1, wherein the conversion mechanism causes a scaling factor of the first image to coincide with a scaling factor of the second image by means of converting the resolution of at least one of the first and second images.

3. The image capturing apparatus according to claim 1, wherein the first image capturing optical system and the second image capturing optical system have substantially the same aspect ratio and pixel size.

4. The image capturing apparatus according to claim 1, wherein the first image capturing optical system includes a fixed focus lens, and the second image capturing optical system includes a zoom lens.

5. The image capturing apparatus according to claim 1, wherein each of the first image capturing optical system and the second image capturing optical system includes a zoom lens.

6. The image capturing apparatus according to claim 1, wherein the computing mechanism includes contrast detection means for detecting contrast of at least one of the first image and the second image; and comparison means for comparing the detected contrast with a reference value; and the image capturing apparatus further comprises focus adjustment means for adjusting focus until the contrast reaches the reference value when the contrast is less than the reference value, wherein the distance computing mechanism executes correlation operation after contrast has reached the reference value.

7. The image capturing apparatus according to claim 1, wherein the distance computing mechanism executes two-dimensional correlation operation as correlation operation.

8. The image capturing apparatus according to claim 1, wherein the distance computing mechanism comprises contrast detection means which divides at least one of the first and second images into a plurality of areas, to thus detect contrast of the respective areas;

comparison means for comparing the detected contrast with a reference value; and selection means for selecting an area where the detected contrast becomes equal to or greater than the reference value, wherein correlation operation of the area selected by the selection means is executed.

9. The image capturing apparatus according to claim 1, wherein the distance computing mechanism has detection means for detecting a characteristic area of a subject from at least one of the first and second images, wherein conversion operation for causing the scaling factor of the first image to coincide with the scaling factor of the second image is performed such that a scaling factor optimal for a scaling factor of the characteristic area of the subject is achieved.

10. The image capturing apparatus according to claim 8, wherein the characteristic area is a person.

* * * * *